United States Patent [19]

Dotson et al.

[11] 4,025,405
[45] May 24, 1977

[54] ELECTROLYTIC PRODUCTION OF HIGH PURITY ALKALI METAL HYDROXIDE

[75] Inventors: Ronald L. Dotson, Mentor; Kevin J. O'Leary, Cleveland Heights, both of Ohio

[73] Assignee: Diamond Shamrock Corporation, Cleveland, Ohio

[22] Filed: Oct. 21, 1971

[21] Appl. No.: 191,424

[52] U.S. Cl. .................. 204/98; 204/128; 204/258; 204/296; 204/290 F; 204/290 R; 260/29.6 F; 260/29.6 SQ

[51] Int. Cl.$^2$ .............. C25B 1/16; C25B 1/26; C25B 13/08

[58] Field of Search .............. 260/29.6 F, 29.6 SQ; 204/98, 128, 296, 258, 290 F, 290 R

[56] References Cited
UNITED STATES PATENTS

| | | | |
|---|---|---|---|
| 2,967,807 | 1/1961 | Osborne et al. | 204/296 |
| 3,282,875 | 11/1966 | Connolly et al. | 204/296 |
| 3,657,104 | 4/1972 | Hodgdon | 204/296 |
| 3,663,414 | 5/1972 | Martinsons et al. | 204/290 F |
| 3,684,543 | 8/1972 | De Nora et al. | 204/290 F |
| 3,694,281 | 9/1972 | Leduc | 204/296 |
| 3,718,551 | 2/1973 | Martinsons | 204/290 F |

FOREIGN PATENTS OR APPLICATIONS 1,184,321   3/1970   United Kingdom

OTHER PUBLICATIONS

"XR Perfluorosulfonic Acid Membranes," New Product Info. from R and D Division – Plastics Dept., 10–1–69.

*Primary Examiner*—R. L. Andrews
*Attorney, Agent, or Firm*—Timothy E. Tinkler; William A. Skinner

[57] ABSTRACT

Concentrated alkali metal hydroxide substantially free of alkali metal halide and other impurities is produced by the electrolysis of an alkali metal halide solution in an electrolytic cell having a dimensionally stable anode and a metal cathode separated by an electrically conductive stable selectively permeable hydrated cation ion-exchange membrane film of a fluorinated copolymer having pendant sulfonic acid groups or derivatives of such groups. The membrane film is capable of use at high temperatures and under severely corrosive chemical conditions for extended periods without degradation.

8 Claims, 2 Drawing Figures

INVENTORS
RONALD L. DOTSON
KEVIN J. O'LEARY

BY Gerard G. Weil

ATTORNEY

ELECTROLYTIC PRODUCTION OF HIGH PURITY ALKALI METAL HYDROXIDE

BACKGROUND OF THE INVENTION

1. Field of the Invention

This invention relates generally to a process and apparatus for producing high purity alkali metal hydroxide in an electrolytic cell.

More specifically this invention relates to a process and apparatus for production of concentrated alkali metal hydroxide substantially free of alkali metal halides and other impurities in an electrolytic cell wherein a stable selectively permeable hydrated membrane is interposed between a dimensionally stable foraminous anode and a cathode to form individual anolyte and catholyte compartments.

2. State of the Art

Concentrated alkali metal hydroxide solutions have previously been prepared by the electrolysis of alkali metal halide solutions in mercury type electrolytic cells, such cells frequently being referred to as flowing cathode mercury cells. The alkali metal hydroxide aqueous solution produced in such cells is generally of high concentration for example about 50 to 73 weight percent alkali metal hydroxide, and substantially free of alkali metal halide. A product with these characteristics directly satisfies the requirements for various industrial applications. However, the mercury type cell currently has several disadvantages the major one being the pollution of streams caused by the effluent of said cells. This discharge has created a mercury pollution problem in the environment wherever such cells are in use. Although extensive efforts have been made to control the amount of mercury pollution caused by the effluent from such cells, it is generally considered that the complete elimination of the pollution of water and soil is virtually impossible. Because of the current objections to any type of pollution and the very strict governmental regulatory provisions proposed to control all types of pollution, there is the imminent possibility that such cells will not be tolerated for more than a few years and soon will become obsolete. Even if improved methods of preventing mercury pollution by the effluent of said cells are found and introduced, and even if governmental regulatory provisions can be met and the cells remain in use, they suffer the additional disadvantages of being expensive and complex, and of frequently causing erratic operating conditions. Also cell operators are constantly exposed to toxic hazards. Large quantities of mercury are required per cell and the market price of mercury is generally high. In addition a certain quantity of the mercury utilized in the normal operation of such cells is irretrievably lost in the effluent streams regardless of the rigid recovery techniques employed to reclaim the mercury from the amalgam formed in the cell.

Diaphragm cells are also known for producing alkali metal hydroxide solutions electrolytically. In this type of cell a porous cathode with an overlying porous diaphragm is used to separate or to serve as a barrier between the catholyte and anolyte compartments of the cell. An objectionable feature of this cell in the electrolysis of alkali metal halide is the porosity of the diaphragm which, although it serves to separate the cell into anode and cathode compartments, permits the aqueous electrolyte solution to be unselectively transported into the cathode compartment. Because of the water content of the electrolyte solution the concentrations of the alklai metal hydroxide product are limited to from about 12 to about 18 weight percent. Another disadvantage of this cell is the tendency of the hydroxyl ion formed in the cathode compartment to migrate back through the porous cathode and diaphragm because of electromigration and diffusion. This so called back-migration results in undesirable side products or impurities and a loss of operating current efficiency in the cell because of the additional current consumed by the cathode-anode anion migration. Prior art efforts to overcome the disadvantage of hydroxyl ion back-migration have resulted in forcing a flow of the alkali metal halide electrolyte through the porous diaphragm by positive means such as hydraulic flow and electro-osmotic pumping. This technique is referred to as the percolating diaphragm method. This type of cell operation results in not only a limitation of the concentration of the alkali metal hydroxide product, since the water content of the circulating aqueous electrolyte solution has a dilution effect and prevents concentration of the hydroxide, but also in retention of the impurities present in the brine initially charged to the cell. Although the alkali metal hydroxide solutions obtained with the diaphragm-type cell may be concentrated to meet higher concentration requirements, the evaporation and purification techniques required are the time consuming, inefficient and objectionably expensive.

In order to overcome the disadvantage of both the mercury and diaphragm-type cells, membrane-type cells have been proposed for producing alkali metal hydroxides. The permselective membranes used in these cells are referred to as cationic since they permit the passage of positively charged ions. They are generally made from cation exchange resins, usually ionogenic particles embedded or grafted into a fiber matrix or carrier. At low caustic concentrations such a cell design limits the back migration of negatively charged hydroxyl ions and slows down the passage of water so that moderately high concentrations of solutions of alkali metal hydroxide are formed in the cathode compartment, however, these cells require the addition of water to the catholyte which causes lower current efficiency. Such membranes are disclosed in U.S. Pat. No. 2,967,807, where their use in the production of alkali metal hydroxide solutions is also shown. Various other permselective and so-called diaphragm-type membranes have been proposed in the prior art and such cationic membranes have solved the problem of halide ion exclusion and to some extent overcome the problem of the back migration of the hydroxyl ions of the porous diaphragm cells as well as the inclusion of objectionable impurities particularly alkali metal halide, in the resultant product of such cells. However, the proposed membrane cells also have limitations which have prevented their wide-spread use such as lower current efficiency, structural degradation, low product concentration, high voltage and reduced operating temperature requirements. The membranes are subject to degradation by the corrosive nature of the chemicals of the cells such as chlorine, caustic and hypochlorite and are also degraded by higher operating temperatures over rather short periods of time. For example, such prior membranes deteriorated after less than one thousand hours of continuous operation. The increased expenses due to the frequent replacement of such membranes has detracted from their use in obtaining improved results over the porous and percolating diaphragm-type cell. The low current efficiencies found when the previous membrane cells were used were caused by hydroxyl ion back-migration to the anode from the cathode chamber and its subsequent oxidation at the anode surface. The low voltage efficiencies were caused by the low permeabilities and heterogeneous gel characteristics of these membrane materials. Also high concentrations of alkali metal hydroxide on the order of 50–56 percent are unobtainable with the use of the previous membrane cells, maximum product concentrations of only about 20 to about 40 percent have been previously produced under optimum conditions.

SUMMARY OF THE INVENTION

It is the principal object of this invention to provide a method and apparatus for electrolytically producing high purity alkali metal hydroxide and chlorine in a membrane-type cell.

It is a further object of this invention to provide a method and apparatus for electrolytically producing high purity alkali metal hydroxide substantially free of alkali halide and other impurities in a membrane type cell with moderately high current efficiency operation.

It is an additional object of this invention to provide a process and apparatus for economically producing alkali metal hydroxide solution of about 30 to greater than about 55 weight percent concentration substantially free of alkali metal halide and other impurities without the necessity of additional purification steps and with minimum cell maintenance requirements.

Other objects and advantages of the invention disclosed herein will become apparent to those skilled in the art from a reading of the following specification and the appended claims, and by reference to the attached drawing.

DESCRIPTION OF THE PREFERRED EMBODIMENTS

Figure 1:
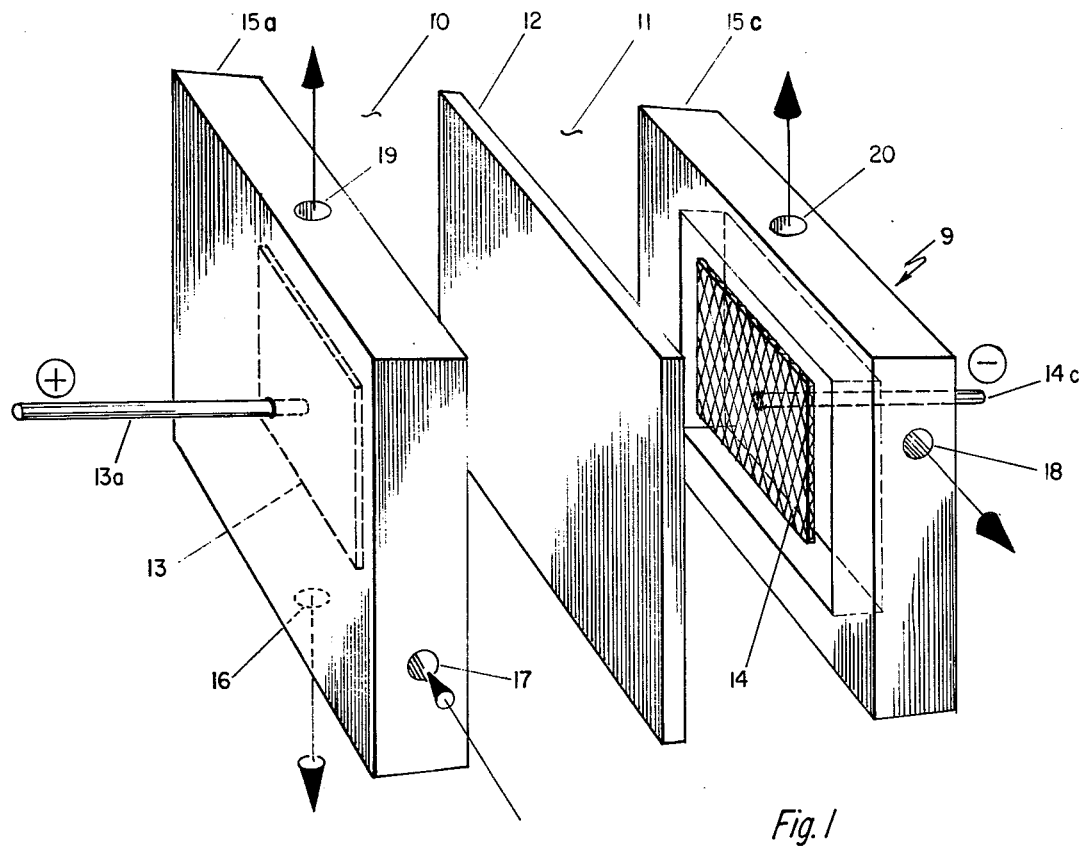
FIG. 1 is a diagrammatic drawing of an electrolytic membrane cell used in accordance with this invention and incorporating the hydrated selectively permeable membranes which have been found useful in accordance with this invention.
Figure 2:
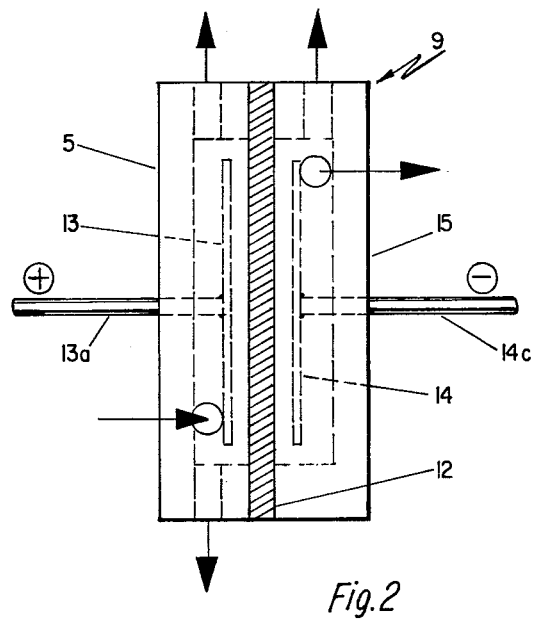
FIG. 2 is a side view of the cell of FIG. 1 in assembled form.

Referring to the drawings the electrolytic cell generally designated at 9, is divided into an anode compartment 10, and a cathode compartment 11, by membrane 12, which is held in position by cell half members 15a and 15c. The cell is also provided with electrolyte inlet 17, spent electrolyte outlet 16, alkali metal hydroxide product outlet 18 and chlorine and hydrogen gas outlets 19 and 20, respectively. A dimensionally stable anode 13 and anode lead 13a, are positioned in the anode compartment 10 and cathode compartment 11 has disposed therein a cathode 14 and cathode lead 14c. The anode may be of any suitable configuration such as a sheet or rod, flat or corrugated, rectangular or unsymmetrical. A foraminous sheet is preferred.

The dimensionally stable anode 13 is comprised of an electrically conductive substrate with a surface coating thereon of a defect solid solution of at least one precious metal oxide and at least one valve metal oxide. In these solid solutions an interstitial atom of valve metal oriented in the characteristic rutile valve metal oxide crystal lattice host structure is replaced with an atom of precious metal. This distinguishes the coating from mere physical mixtures of the oxides, since pure valve metal oxides are in fact insulators. Such substitutional solid solutions are electrically conductive, catalytic and electrocatalytic.

Within the above-mentioned solid solution host structures the valve metals include: titanium, tantalum, niobium and zirconium while the implanted precious metals encompass platinum, ruthenium, palladium, iridium, rhodium and osmium. The mole ratio of valve metal to precious metal varies between 0.2–5:1, approximately 2:1 being presently preferred. The electrically conductive substrate may be constructed of the valve metals which are defined above as included in the solid solutions. Titanium dioxide-ruthenium dioxide solid solution coatings and titanium substrates are presently the preferred types of these materials.

If desired, these solid solutions may be "modified" by the addition of other components which may either enter into the solid solution itself or admix with same to achieve the desired result. For instance, it is known that a portion of the precious metal oxide, up to 50%, may be replaced with other metal oxides without substantial detrimental effect on the overvoltage.

The above-mentioned solid solution coatings and thermochemical deposition thereof on a substrate are described in more detail in published South African Pat. No. 68/1834 and in British Pat. No. 1,195,871.

Other dimensionally stable anodes constructed of an electrically conductive substrate, e.g., a valve metal substrate, having a coating of platinum group metals and alloys thereof on at least a portion of the substrate may be used with good results. A platinum-iridium alloy coating on a titanium or tantalum substrate is particularly advantageous. The platinum group metals encompass the precious metals of the above-described solid solutions. Another type of suitable dimensionally stable anode consists of an anode bearing a coating of a matrix of tin oxide and antimony oxide in which a small amount of platinum group metal or platinum group metal oxide is dispersed, on at least a portion of an electrically conductive substrate.

The cathode may be any suitable conductive material or metal capable of withstanding the corrosive catholyte cell conditions and which is characterized by low hydrogen overvoltage. A useful metal is generally selected from the group of foraminous metals having a surface area and consisting of stainless steel, nickel, cobalt, titanium, steel, lead and platinum. The cathode may be in the form of a solid sheet or other solid metal configuration or preferably it may be foraminous such as expanded metal mesh or screen of high surface area. A foraminous stainless steel cathode with high surface area and good gas release characteristics is especially preferred because it does not contaminate the caustic when depolarized. In some cases it has been found that the cell of this invention can be operated more efficiently by using a polytetrafluoroethylene cloth mesh backing on the cathode side of the membrane, particularly in conjunction with a stainless steel cathode as the hydrophobic fibers of the backing allow hydrated sodium ions to pass to the cathode and prevent hydroxyl back-migration to the anode as the cloth fibers are not wetted by the cell solutions.

The membrane is preferably a film formed from a stable hydrated ion-exchange resin which is a fluorinated copolymer having pendant sulfonic acid groups and contains a copolymer having recurring structural units of the formula:

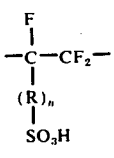  (1)

and

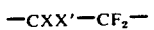  (2)

wherein R represents the group

in which
R' is fluorine or perfluoralkyl of 1 to 10 carbon atoms,
Y is fluorine or trifluoromethyl, and $m$ is 1, 2 or 3,
$n$ is o or 1; x is fluorine, chlorine, hydrogen or trifluoromethyl; and X' is X or $CF_3$ $+CF_{2}-$ wherein z is o or an integer from 1 to 5; the units of formula (1) being present in an amount from 3 to 20 mole percent.

The stable membranes corresponding to the above structural formula useful in the practice of this invention have a water absorption of about 18% to about 38% in accordance with ASTM-D570 standard testing procedures, and an equivalent weight of about 1000 to about 1300 and are sold by E. I. DuPont deNemours & Co., Inc. under the trade name XR PERFLUOROSULFONIC ACID MEMBRANES and NAFION PERFLUORO-SULFONIC ACID MEMBRANES. The membranes and the method of preparation thereof are described in more detail in British Pat. No. 1,184,321 and U.S. Pat. No. 3,282,875. A technical bulletin published by E. I. DuPont deNemours & Co., Plastics Department, on Oct. 1, 1969 entitled *XR PERFLUORO-SULFONIC ACID MEMBRANES* includes a detailed description of various physical and chemical properties of these membranes which illustrates the outstanding chemical thermal and oxidative stability thereof. The word stable as used herein in describing these membranes defines and encompasses the unique chemical thermal and oxidative stability of these membranes.

The invention will now be described with reference to the production of chlorine and of a caustic soda product of high purity made by the electrolysis of brine solution, but it is to be understood that the invention is not restricted to production of sodium hydroxide but may also be utilized for making other alkali metal hydroxides by the electrolysis of other aqueous metal halide solutions such as potassium chloride. The process of the invention may be carried out on a continuous basis by continuously introducing brine solution into the anode compartment of an electrolytic cell and initially introducing aqueous solution having a caustic soda content of about one to about 50 weight percent or water into the cathode compartment of the cell, decomposing the brine solution by imposing a potential difference between the dimensionally stable anode and the cathode of said cell while maintaining the temperature of the solution in the cell at about 35° C. to about 100° C., preferably about 65° C. to about 90° C., and the pH at from 1.0 to about 5.5, preferably from about 2.0 to about 3.5, whereby the water and sodium ions are transported through a permselective cation exchange membrane film of the fluorinated copolymer having the previously described structural formula. The sodium ions pass through said membrane into the cathode compartment from the anode compartment along with water. A portion of the water molecules are reduced at the cathode to form hydrogen and hydroxyl ions and subsequently sodium hydroxide solution of predetermined concentration in the cathode compartment. The caustic solution is continuously removed from the cathode compartment generally without the introduction, from a souce external of the cell, of additional water or caustic to said compartment after the initial introduction. Although the continuous addition of water or dilute alkali metal hydroxide to the catholyte from a separate source is not required during continuous operation, and no further such additions are generally made after the initial introduction such addition may be optionally desirable to adjust the alkali metal hydroxide concentration in the cathode compartment. The chloride ions in the brine solution are attracted to the anode, oxidized and released from the anode compartment as chlorine gas. Hydrogen gas formed in the cathode compartment at the same time as the sodium hydroxide, is removed from the cathode compartment through a suitable vent. The membrane may be of variable thickness, generally from about one mil to about 50 mils, but to obtain the higher concentrations of sodium hydroxide membranes of 10 mils and 20 mils thickness, have been found to provide optimum results at two distinctly different caustic concentration levels. In using a 10 mil membrane having a water absorption of about 25% caustic concentrations in the range of about 29% to about 44% by weight substantially free of sodium chloride are produced with high current efficiency; with a 20 mil membrane having a water absorption of about 25% to about 38%, even higher efficiencies are obtained. The pressure differential between the anode and cathode compartments is one of the controlling factors in altering the amount of water transmitted osmotically from the anode compartment through the membrane. The water transmission from the anode compartment may be depressed by maintaining positive pressure in the cathode compartment thus increasing the caustic concentration. Thus the pressure differential between the anolyte and the catholyte compartments, the thickness of the membrane and current density can be controlled within established limits in order to obtain desired caustic concentrations at satisfactory current efficiencies. The temperature in both the anode and catholyte compartments may vary widely from about 35° C. to about 95° C. and within the range of about 70° C. to about 80° C. satisfactory results have been obtained. The space between the membrane and each of the electrodes can be from about one tenth of a mil to about one inch for satisfactory results and is generally maintained from about one-sixteenth of an inch to about five-sixteenths inch. For optimum current efficiencies the anode to membrane gap preferably should be about one-sixteenth to about three-sixteenths of an inch and the cathode to membrane gap from about one-sixteenth to about one-fourth of an inch.

One unique feature of the process of the invention which distinguishes it from the prior art is the fact that the process is operable without the introduction of water or dilute alkali metal hydroxide solution directly into the cathode compartment from a source external of the cell since all the water which reacts in the cathode compartment is transported directly through the membrane as water of hydration in association with the migrating sodium ions or through electroosmotic transfer. Prior techniques for producing concentrated caustic solutions other than the flowing mercury cathode process all require the introduction of water or a dilute aqueous caustic solution into the cathode compartment of an electrolytic cell during electrolysis and such addition results in a loss of current efficiency. As noted above in the practice of this invention water or dilute alkali metal hydroxide solution is usually introduced to the cathode compartment only initially and added subsequently only if optionally desired.

The brine solution introduced into the anode compartment may vary widely from about 100 g/l to about 325 g/l of NaCl concentration but preferably is maintained at from about 160 g/l to the saturation concentration of NaCl. Also excellent results may be obtained in the practice of this invention when either high purity or impure alkali metal halide solutions are employed as the anolyte. During either batch or continuous operation alkali metal halide is usually introduced to the anode compartment as an aqueous solution of desired concentration. However, the alkali metal halide may obviously be introduced as a combination of dry halide salt and water in amounts calculated to provide a desired predetermined concentration. In some cases after the initial introduction of alkali metal solution to the anode compartment, the addition of dry halide to the anode compartment may be desirable during either batch or continuous operation to maintain the concentration of the alkali metal halide anolyte at a desired level.

The cell of the present invention is constructed in two hollow sections which allows the fluorinated copolymer cation exchange resin film to be positioned and maintained in closely spaced relation to each electrode surface by insertion of the membrane between the cell sections in a "sandwich" arrangement. This design may easily be modified to a filter press system of series or parallel cells. The cell anode section 15a supports the dimensionally stable anode and is also provided with an alkali metal halide electrolyte inlet, a spent electrolyte outlet and a chlorine gas outlet in the hollow portion thereof. Electrical connection means are also attached to the cell anode section for supplying current to the anode. The hollow portion of the cell cathode section 15c has a cathode disposed therein and is also provided with an aqueous alkali metal hydroxide solution outlet and a hydrogen gas outlet. When the cell anode and cathode sections are assembled with the membrane of 10 to 20 mils in thickness disposed over the hollow portions of each section and the assembly maintained in a predetermined fixed position by any suitable means such as clamping devices, screws or bolts, and the like, good current efficiency and high yield of aqueous moderately concentrated alkali metal hydroxide solutions substantially free of alkali metal halide result from the electrolysis of saturated alkali metal halide solutions. The material of construction of the cells may be any material resistant to or inert to the cell environment. Organic plastics such as polyvinyl chloride, polyvinyl fluoride, polypropylene and inert resistant inorganic materials are useful for the cell container sections. The unique construction of the cell which affords high current efficiency and excellent product yield also facilitates an arrangement for connecting a large number of such cells in series or parallel in a limited area. Significant savings are achieved through the resultant minimizing of floor space and the ease of replacing individual cells for maintenance without interruption of the entire cell bank operation.

In order that those skilled in the art may more readily understand the present invention, specific examples are presented in Tables I to III below.

Table I shows the production of concentrated alkali metal hydroxide solution substantially free of alkali metal halide with good current efficiencies at variable voltages and current densities, membrane properties and cell compartment temperatures. In Examples 1 to 5 saturated brine solution was continuously introduced into the anolyte compartment of the type of electrolytic cell illustrated in the attached drawings and electrolyzed in accordance with the parameters shown in the examples. In Example 6 an aqueous solution of potassium chloride containing 250 g/l of KCl was continuously introduced into the anolyte compartment and electrolyzed as specified in the example.

Table II illustrates the effect of varying the residence time of the anolyte, which directly corresponds to brine flow velocity, during continuous introduction of a brine solution containing 280 g/l NaCl into the anolyte compartment of the same type of cell as in Example I. The temperature in each of the anode and cathode compartments was maintained at 82° C. and the caustic product obtained had a concentration of 370 g/l. The brine flow velocity was controlled at a rate sufficiently low to prevent formation of sodium chlorate and sufficiently high to avoid severe depletion of the sodium chloride content of the brine. It will be observed from the table that current efficiency improves with a decrease in brine velocity. Such results are entirely unexpected and surprising as one skilled in the art would expect just the reverse to be the case. In other words, the current efficiency would be predicted by a skilled artisan to be improved by an increase in brine velocity. From the data of the table it will be readily understood that control of the velocity of the brine continuously introduced into the anolyte compartment is an important feature of this invention.

Table III shows the variation of caustic product concentration in respect to a variation in feed brine concentration in the same type of electrolytic cell utilized in the examples of Table I. It will be readily understood from Table III that the concentration of caustic product increases directly with an increse in the concentration of the anolyte feed brine and that satisfactory caustic products can be obtained with the low concentrations of anolyte feed brine solutions.

TABLE I

| Example Number | Current Density amps/in.$^2$ | Voltage | Membrane Properties | | Temperature ° C. in Compartments | | Current Efficiency % | Product Concentration g/l | Halide Content of Product g/l |
| | | | Thickness in Mils | Water Absorption % | Anode | Cathode | | | |
| --- | --- | --- | --- | --- | --- | --- | --- | --- | --- |
| 1 | 1 | 3.46 | 10 | 25 | 76 | 86 | 84.5 | 539 NaOH | 0.12 NaCl |
| 2 | 1 | 4.07 | 10 | 25 | 80 | 81 | 89.5 | 605 NaOH | 0.42 NaCl |

TABLE I-continued

| Example Number | Current Density amps/in.² | Voltage | Membrane Properties Thickness in Mils | Membrane Properties Water Absorption % | Temperature °C. in Compartments Anode | Temperature °C. in Compartments Cathode | Current Efficiency % | Product Concentration g/l | Halide Content of Product g/l |
|---|---|---|---|---|---|---|---|---|---|
| 3 | 2 | 5.4 | 20 | 25 | 65 | 75 | 85.6 | 760 NaOH | 0.45 NaCl |
| 4 | 2 | 5.5 | 20 | 25 | 72 | 72 | 78.1 | 875 NaOH | 0.08 NaCl |
| 5 | 2.9 | 5.12 | 10 | 38 | — | 92 | 74 | 310 NaOH | 0.9 NaCl |
| 6 | 1.0 | 5.6 | 20 | 25 | 72 | 81 | 51.2 | 559 KOH | 0.5 KCl |

TABLE II

| Example Number | Residence Time of Anolyte (Minutes) | Percent Loss of Current Efficiency Due to Sodium Chlorate Formation | Membrane Properties Thickness in Mils | Membrane Properties Water Absorption % | Current Density Amps/in.² |
|---|---|---|---|---|---|
| 7 | 230 | 15 | 10 | 25 | 1.0 |
| 8 | 115 | 17 | " | " | " |
| 9 | 77 | 19 | " | — | " |
| 10 | 58 | 21 | " | " | " |
| 11 | 46 | 23 | " | " | " |
| 12 | 38 | 25 | " | " | " |
| 13 | 33 | 27 | " | " | " |
| 14 | 29 | 29 | " | " | " |
| 15 | 23 | 33 | " | " | " |
| 16 | 12 | 40 | " | " | " |

TABLE III

| Example Number | Current Density amps/in.² | Voltage | Membrane Properties Thickness in Mils | Membrane Properties Water Absorption % | Temperature °C. in Compartments Anode | Temperature °C. in Compartments Cathode | Current Efficiency % | NaOH Product Concentration g/l | NaCl Content of Anolyte Feed Brine g/l |
|---|---|---|---|---|---|---|---|---|---|
| 17 | 1.0 | 3.91 | 20 | 25 | 75 | 75 | 67.6 | 315 | 126 |
| 18 | " | 3.83 | " | 25 | " | " | 65.0 | 315 | 133 |
| 19 | " | 4.00 | " | 25 | " | " | 72.6 | 332 | 160 |
| 20 | 41 | 4.38 | 41 | 25 | 41 | " | 77.0 | 353 | 160 |
| 21 | " | 4.50 | " | 25 | " | " | 80.5 | 350 | 161 |

From the above examples it is obvious that concentrated aqueous sodium hydroxide and potassium hydroxide solutions substantially free of sodium and potassium chlorides respectively, can be obtained by the practice of the present invention at variable temperatures, current densities and/alkali metal halide electrolyte concentrations. High purity products of predetermined concentrations are obtained at high current efficiencies when hydrated membranes of specified structure, properties and thickness are included in the cell arrangement.

Although the invention has been described with reference to certain preferred embodiments thereof, it is not to be so limited since changes and alterations may be made therein which are within the full and intended scope of the appended claims.

We claim:
1. A process for the continuous production of alkali metal hydroxide substantially free from alkali metal halide and other impurities which comprises:
   a. continuously providing an aqueous alkali metal halide solution to the anode compartment of an electrolytic cell in which a dimensionally stable anode and a cathode are maintained in separate anode and cathode compartments, respectively, by a stable, hydrated, cation selective, hydraulically impermeable, electrically conductive membrane interposed between said anode and said cathode;
   b. electrolyzing the alkali metal halide solution while maintaining said solution at a temperature of from about 35° C. to about 100° C. and at a pH of about 1.0 to about 5.5, the sole source of water to the cathode compartment after startup being that transported through said membrane;
   c. continuously removing alkali metal hydroxide solution, substantially free from alkali metal halide and other impurities, and hydrogen from the cathode compartment and halogen from the anode compartment; said membrane consisting essentially of a film of a fluorinated copolymer having pendant sulfonic acid groups or derivatives thereof and containing recurring structural units of the formula:

and

wherein R represents the group $$-CF-CF_2-O+CFY-CF_2O\rightarrow_m$$
$$\phantom{-CF-}|\phantom{CF_2-O+CFY-CF_2O\rightarrow_m}$$
$$\phantom{-CF-}R'$$

in which R' is fluorine or perfluoroalkyl of 1 to 10 carbon atoms, Y is fluorine or trifluoromethyl, and m is 1, 2 or 3, n is 0 or 1; X is fluorine, chlorine, hydrogen or trifluoromethyl; and X' is X or $CF_3+CF_2+_z$ wherein $z$ is 0 or an integer from 1 to 5; the units of formula (1) being present in an amount from 3 to 20 mole percent.

2. The process of claim 1 wherein a space of from about one tenth of a mil to about one inch is maintained between the interposed membrane and the anode and cathode, respectively.

3. The process of claim 2 wherein the said space is from about one-sixteenth of an inch to about five-sixteenths of an inch.

4. The process of claim 1 wherein the aqueous alkali metal halide solution is sodium chloride solution having a concentration of about 100 g/l to about 325 g/l.

5. The process of claim 1 wherein the alkali metal halide solution is introduced into the anode compartment at a rate sufficiently low to prevent formation of alkali metal halogenate and sufficiently high to avoid severe depletion of the alkali metal halide content of the alkali metal halide solution in the anode compartment.

6. The process of claim 1 wherein aqueous alkali metal hydroxide solution or water are initially added to the cathode compartment of the electrolytic cell.

7. The process of claim 1 wherein the cathode side of said membrane has a polytetrafluoroethylene cloth mesh backing.

8. A process for production of halogen and alkali metal hydroxide comprising:
a. electrolyzing an aqueous alkali metal halide solution in the anode compartment of an electrolytic cell in which a dimensionally stable anode and a metallic cathode are separated by a stable, hydrated, cation selective, hydraulically impermeable, electrically conductive membrane into respective anode and cathode compartments;
b. maintaining the temperature of said solution from about 35° to 100° C. and the pH of said solution at from about 1.0 to about 5.5 during electrolysis; and
c. removing a 30 to 55 percent by weight alkali metal hydroxide solution, substantially free of alkali metal halide and other impurities, and hydrogen from the cathode compartment and halogen from the anode compartment;

said membrane consisting essentially of a film of a fluorinated copolymer having pendant sulfonic acid groups or derivatives thereof and containing recurring structural units of the formula:

and

wherein R represents the groups

in which R' is fluorine or perfluoroalkyl of 1 to 10 carbon atoms, Y is fluorine or trifluoromethyl, and $m$ is 1, 2 or 3, $n$ is 0 or 1; X is fluorine, chlorine, hydrogen or trifluoromethyl; and X' is X or $CF_3\text{--}(CF_2)_z$ wherein $z$ is 0 or an integer from 1 to 5; the units of formula (1) being present in an amount from 3 to 20 mole percent.

* * * * *